(12) United States Patent
Farnsworth

(10) Patent No.: US 8,532,593 B2
(45) Date of Patent: Sep. 10, 2013

(54) METHOD AND APPARATUS FOR STORING FREQUENCIES

(75) Inventor: Andrew Farnsworth, Marlbrook (GB)

(73) Assignee: BlackBerry Limited, Waterloo (CA)

( * ) Notice: Subject to any disclaimer, the term of this patent is extended or adjusted under 35 U.S.C. 154(b) by 1006 days.

(21) Appl. No.: 12/138,661

(22) Filed: Jun. 13, 2008

(65) Prior Publication Data
US 2009/0311983 A1  Dec. 17, 2009

(51) Int. Cl.
*H03C 1/62* (2006.01)

(52) U.S. Cl.
USPC .......................................... 455/115.1; 455/91

(58) Field of Classification Search
CPC .................................................. H04B 17/0025
USPC ................ 455/91–129, 73–88, 115.1, 115.4; 370/347, 345
See application file for complete search history.

(56) References Cited

U.S. PATENT DOCUMENTS

| | | | |
|---|---|---|---|
| 5,280,636 A | 1/1994 | Kelley et al. | |
| 2005/0233765 A1 | 10/2005 | Sanders et al. | |
| 2006/0039309 A1 | 2/2006 | Lee et al. | |
| 2008/0107098 A1* | 5/2008 | Spencer et al. | 370/347 |
| 2009/0094356 A1* | 4/2009 | Vare | 455/115.1 |
| 2010/0030517 A1* | 2/2010 | Schmidt | 702/179 |

FOREIGN PATENT DOCUMENTS

EP  1843613  10/2007

OTHER PUBLICATIONS

European Search Report for European Application No. 08158243.9-2412.
3GPP TS 25.331 V5 17.0 (Jun. 2006), Technical Specification 3rd Generation Partnership Project; Technical Specification Group Radio Access Network; Radio Resource Control (RRC); Protocol Specification (Release 5).
3GPP TS 25.101 V7.11.0 (Mar. 2008), Technical Specification 3rd Generation Partnership Project; Technical Specification Group Radio Access Network; User Equipment (UE) Radio Transmission and Reception (FDD); (Release 7).
Lis, Sophia Antipolis, "Universal Mobile Telecommunications System (UMTS); Characteristics of the Universal Subscriber Identity Module (USIM) application (3GPP TS 31.102 version 7.12.0 Release 7); ETSI TS 131 102", ETSI Standards, Cedex France, vol. 3-T3 No. V7.1.20, Apr. 1, 2009, XP014041786 ISSN: 0000-0001, Sections 4.2.57 and 5.3.23, Annex D.
Cedex, Sophia-Antipolis, NTT COCOMO: :further discussion on Additional Frequency Bands, 3Gpp Draft; R2-050638, 3rd Generation Partnership Project (3GPP), Mobile Competence Centre; 650, Route Des Lucioles; F-06921, France, vol. tsg_ran/WG2_RL2/TSGR2_46/Documents, no. Scottsdale, USA; 20050214, Feb. 18, 2005, XP050127865.
European Search Report for European Application No. 08158243.9-2412, 2008.

* cited by examiner

*Primary Examiner* — Lana N Le
(74) *Attorney, Agent, or Firm* — Novak Druce Connolly Bove + Quigg LLP

(57) ABSTRACT

A method, in a wireless communications apparatus, the method comprising: identifying a previously used frequency as incompatible with a parameter storage area; performing an arithmetical operation on the value of the previously used frequency to give a modified value of the previously used frequency; and storing the modified value of the previously used frequency in the parameter storage area.

24 Claims, 11 Drawing Sheets

| UMTS Operating Band | UL frequencies, UE transmit, Network receive (MHz) | DL frequencies, UE receive, Network transmit (MHz) |
|---|---|---|
| I | 1920 - 1980 | 2110 - 2170 |
| II | 1850 - 1910 | 1930 - 1990 |
| III | 1710 - 1785 | 1805 - 1880 |
| IV | 1710 - 1755 | 2110 - 2155 |
| V | 824 - 849 | 869 - 894 |
| VI | 830 - 840 | 875 - 885 |
| VII | 2500 - 2570 | 2620 - 2690 |
| VIII | 880 - 915 | 925 - 960 |
| IX | 1749.9 - 1784.6 | 1844.9 - 1879.9 |
| X | 1710 - 1770 | 2110 - 2170 |

METHOD AND APPARATUS FOR STORING FREQUENCIES

TECHNICAL FIELD

This application relates to telecommunication systems in general, having for example application in UMTS (Universal Mobile Telecommunications System) and in particular relates to a method and apparatus for storing frequencies.

DESCRIPTION OF THE RELATED ART

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that the invention is not intended to be limited to any particular mobile telecommunications system.

The radio access network covers a geographical area divided into a plurality of cell areas. Each cell area is served by at least one base station, which in UMTS may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.304 technical specification v7.1.0, incorporated herein by reference and referred to herein as the 25.304 specification, addresses the subject of UE procedures in idle mode and procedures for cell reselection in connected mode. Section 5.1.2.2 of the 25.304 specification defines the required support for PLMN Selection in the UMTS Terrestrial Radio Access (UTRA) case. This requires the UE to scan all RF channels in the UTRA bands it supports to find available PLMNs.

A scan to find available PLMNs must be performed regularly such that if the UE is moving, new PLMNs may be detected for the UE to communicate with. However, attempting to detect a PLMN on a frequency can take about 250 ms, and in some cases it may take about 500 ms. A UE will support at least one UMTS band, for example band I. In band I there are 277 frequencies, so in some cases it will take a UE over 2 minutes to search for PLMNs on band I. Some UEs support more than one band, giving rise to yet longer timescales.

Thus, searching for available PLMNs can take a significant amount of time. Furthermore, the PLMN search consumes processing power and battery resources. One way to reduce the amount of resources a search for available PLMNs takes is for the UE to store information concerning previously used cell frequencies. The UE may then perform an initial search for PLMNs on previously used frequencies, which may result in the UE finding an available PLMN without performing a full PLMN search.

There are thus proposed strategies for a method and apparatus for storing frequencies. A number of such strategies are detailed below.

Other aspects and features of the proposed strategy will become apparent to those ordinarily skilled in the art upon review of the following description of specific embodiments of an apparatus and method for a method and apparatus for storing frequencies.

The invention is set out in the claims.

BRIEF DESCRIPTION OF THE DRAWINGS

Embodiments will now be described, by way of example only, with reference to the attached drawings, in which.

The same or similar reference numerals are used in different figures to denote similar elements.

DETAILED DESCRIPTION OF THE DRAWINGS

Figure 1:
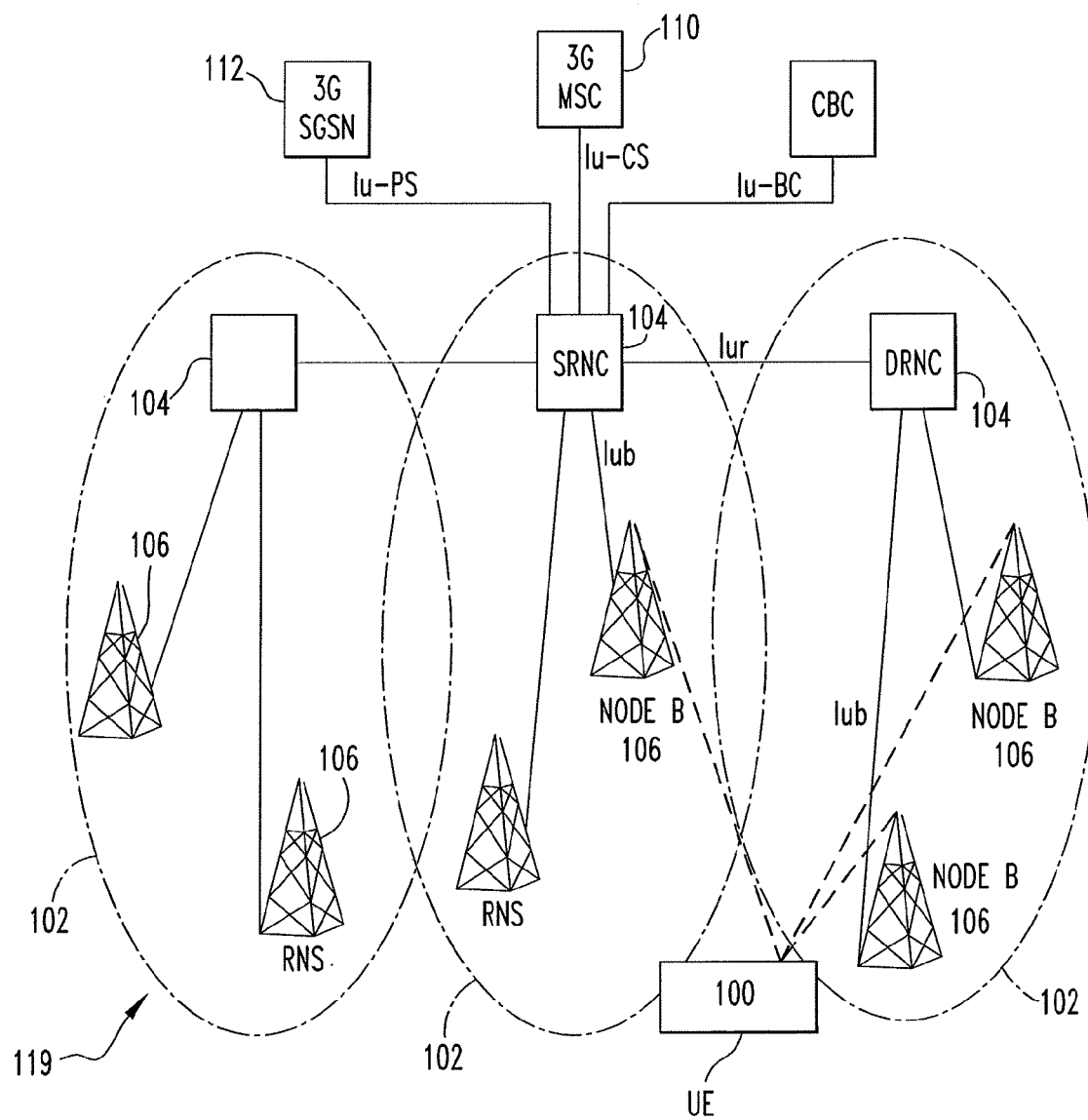
FIG. 1 shows an overview of a network and a user equipment device.

The method disclosed herein may be implemented in a user equipment device of a wireless communications network. Referring to the drawings, FIG. 1 is a schematic diagram showing an overview of a network and a user equipment device. Clearly in practice there may be many user equipment devices operating with the network but for the sake of simplicity FIG. 1 only shows a single user equipment device 100. For the purposes of illustration, FIG. 1 also shows a radio access network 119 (UTRAN) used in a UMTS system having a few components. It will be clear to a person skilled in the art that in practice a network will include far more components than those shown.

The network 119 as shown in FIG. 1 comprises three Radio Network Subsystems (RNS) 102. Each RNS has a Radio Network Controller (RNC) 104. Each RNS 102 has one or more Node B 102 which are similar in function to a Base Transmitter Station of a GSM radio access network. User Equipment UE 100 may be mobile within the radio access network. Radio connections (indicated by the straight dotted lines in FIG. 1) are established between the UE and one or more of the Node Bs in the UTRAN.

Consider as an example a wireless mobile device which complies with the 3GPP specifications for the UMTS protocol. Such a wireless mobile device is generally referred to as user equipment (UE). The 3GPP technical specification 25.331, v 5.17.0, incorporated herein by reference and referred to herein as the 25.331 specification, addresses the subject of Radio Resource Control protocol for the UE—UTRAN (UTRA Network) interface.

Figure 2:
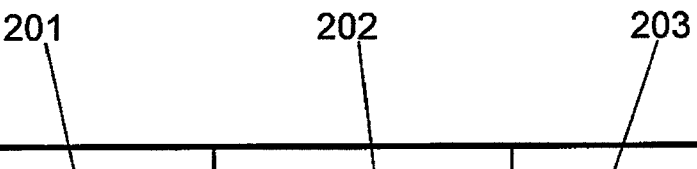
FIG. 2 is a table of the uplink and downlink frequency ranges used by each UMTS operating band

A UMTS Terrestrial Radio Access (UTRA) is designed to operate in bands using Frequency Division Duplex (FDD). There are a plurality of bands both proposed and in use. Furthermore, new bands are frequently added to the UMTS specification. 3GPP technical specification 25.101, v 7.11.0, incorporated herein by reference and referred to herein as the 25.101 specification, shows ten UMTS operating bands at section 5.2. FIG. 2 shows these ten operating bands 201, numbered I to X. Each operating band 201 comprises an uplink (UL) frequency range 202 and a downlink (DL) frequency range 203. A plurality of frequency channels are available within each band. A nominal frequency channel spacing is 5 MHz, but this may be altered to optimise network performance of a particular installation. Frequency Division Duplex (FDD) defines the use of a separate frequency channel for uplink and downlink communications between the UE and the UTRAN.

Figure 3:
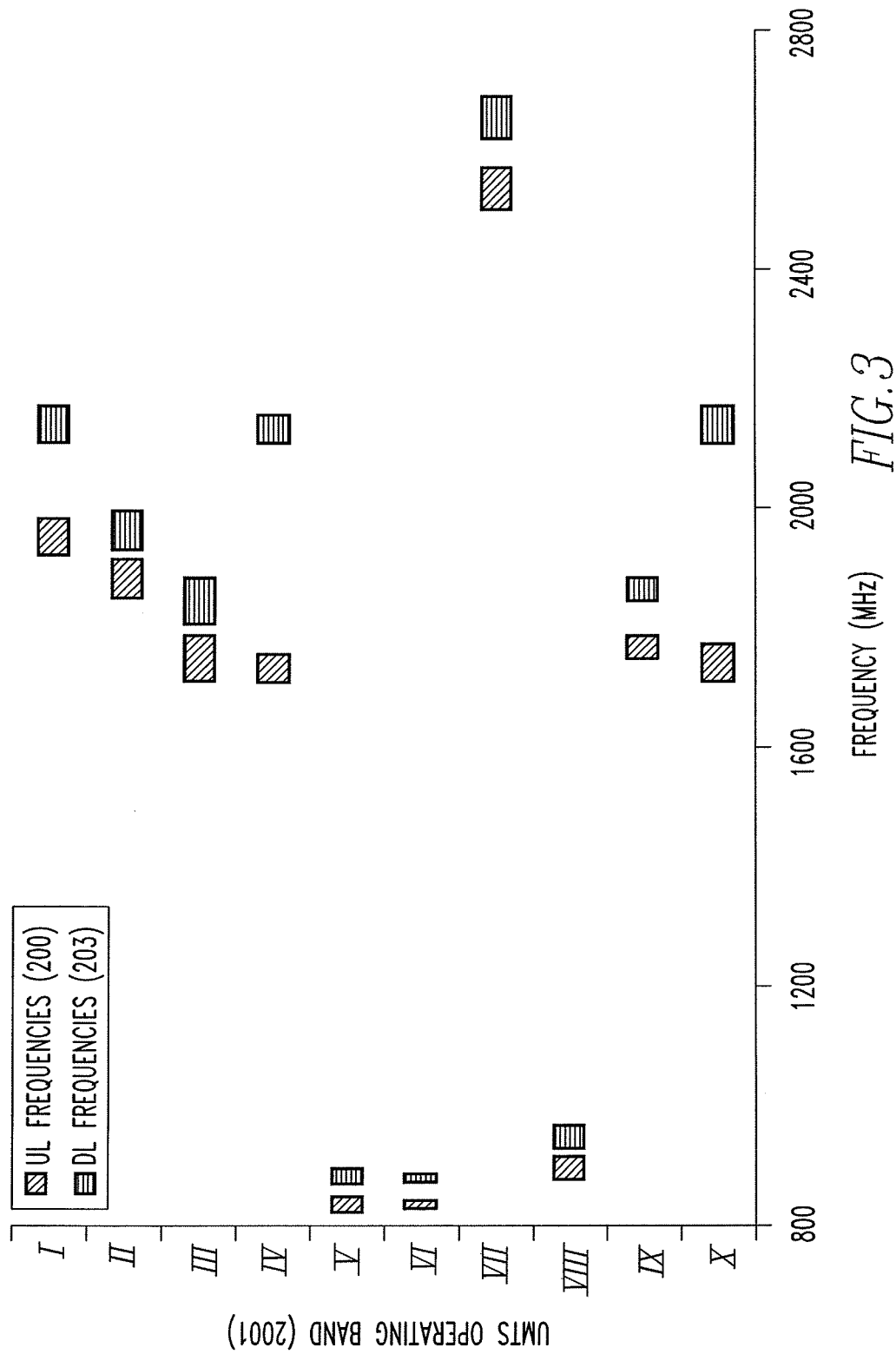
FIG. 3 is an illustration of the information from FIG. 2, showing the relative positions of the uplink and downlink frequency ranges for each UMTS operating band.

FIG. 3 is an illustration of the information from the table of FIG. 2, showing the relative positions of the uplink and downlink frequency ranges for each UMTS operating band. Uplink frequencies 202 are shown with diagonal shading and downlink frequencies 203 are shown with vertical shading. Frequency in MHz (megahertz) is shown on the horizontal axis with a range from 800 to 2800 MHz.

Figure 4:
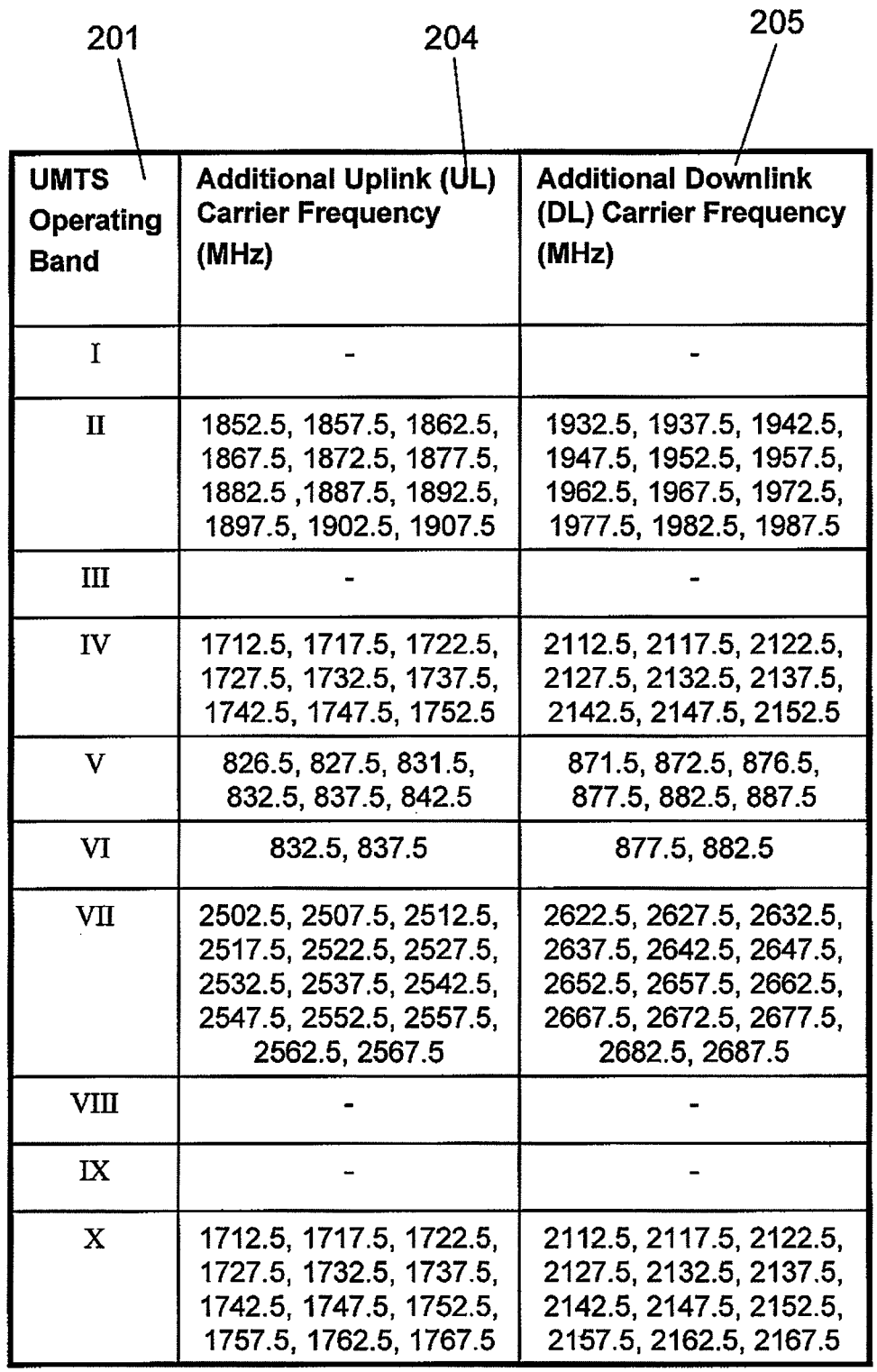
FIG. 4 is a table of additional frequencies.

At section 5.4.2, the 25.101 specification states that the channel raster is 200 kHz (kilohertz) for all bands. This means that the centre frequency for each frequency used must be an integer multiple of 200 kHz. However, additional frequencies are specified at section 5.4.3 of the 25.101 specification which are shifted 100 kHz relative to the general 200 kHz raster. The table of FIG. 4 shows additional uplink frequencies 204 and additional downlink frequencies 205. Presently there are no additional frequencies for bands I, III, VIII and IX. Each of the additional frequencies do not lie on the 200 kHz raster, that is, dividing the value of an additional frequency by 200 kHz (0.2 MHz) does not give a whole number result.

The 3GPP 31.102 specification, v 7.9.0, incorporated herein by reference and referred to herein as the 31.102 specification, addresses the subject of the characteristics of the Universal Subscriber Identity Module (USIM) application. Section 4 of the 31.102 specification defines the Elementary Files (EFs). The Elementary Files are stored in the USIM and they contain service and network related information. For example, section 4.2.1 of the 31.102 specification defines the Elementary File for Language Indication ($EF_{LI}$). $EF_{LI}$ contains the codes for one or more languages. This information is determined by the user or operator, and defines the preferred languages of the user in order of priority. This information may also be used for the screening of Cell Broadcast messages in a preferred language.

Section 4.2.57 of the 31.102 specification defines the Elementary File for Network Parameters ($EF_{NETPAR}$). $EF_{NETPAR}$ contains information concerning previously used cell frequencies. Network Parameter storage using $EF_{NETPAR}$ may reduce the extent of the terminal search of FDD (Frequency Division Duplex), TDD (Time Division Duplex) or GSM (Global System for Mobile communications) carriers when selecting a cell.

The RF carrier frequency information is stored in $EF_{NETPAR}$ on 2 bytes and coded on 16 bits starting from 0.0 MHz. Each increment of the 16 bit value is an increment of 200 kHz in frequency, this being in accordance with the general 200 kHz raster on which the majority of frequencies lie. This allows the exact channel frequency to be stored in this data field making it independent of any band information. It is up to the terminal to associate the indicated frequency with a particular band, e.g. GSM 900, GSM 1800 etc. This means that a range from 0 to 13.1 GHz can be covered, with the resolution of 200 kHz. The frequency indicated is the terminal receiver carrier frequency.

A problem with $EF_{NETPAR}$ as defined by the 31.102 specification is that the file is arranged to only store frequencies on the 200 kHz raster. Accordingly, it is not possible to store the additional frequencies 204, 205 in $EF_{NETPAR}$ in the conventional way. Embodiments of the method disclosed herein address this problem.

Figure 5:
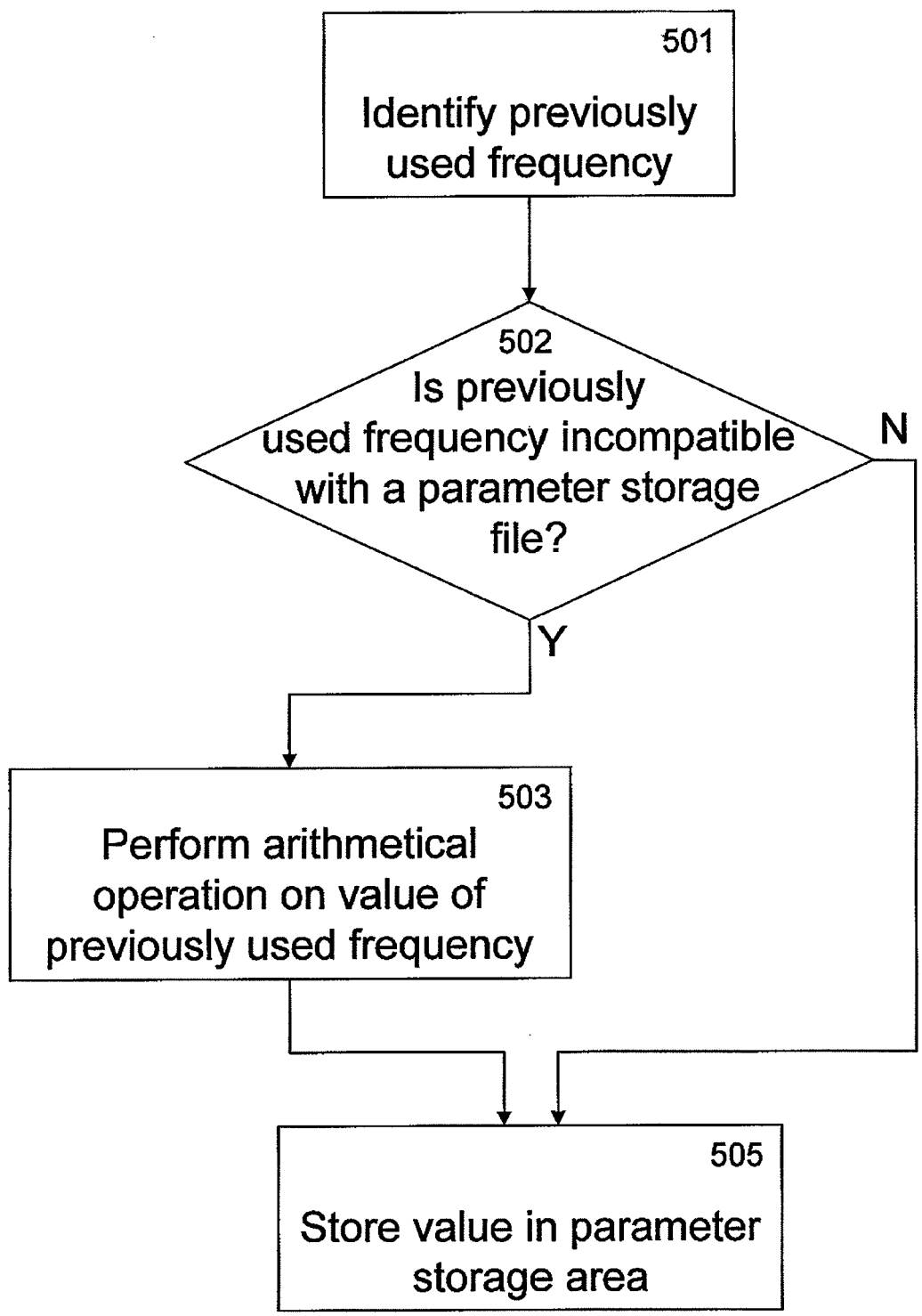
FIG. 5 illustrates a method of storing additional frequencies.

FIG. 5 illustrates a method of storing additional frequencies 204, 205. If the frequency to be stored does not lie on the 200 kHz raster, then it is determined to be incompatible with the parameter storage area and an arithmetical operation is performed on the value in order to shift it so as to lie on the 200 kHz raster where there are no known UMTS bands operating. The modified value is stored in the parameter storage area, which is possible because it lies on the 200 kHz raster. Referring to FIG. 5, at 501 a previously used frequency is identified as requiring storage. At 502 it is determined whether the previously used frequency is incompatible with a parameter storage area. If the determination at 502 is negative the value of the previously used frequency is stored in the parameter storage area at 505. If the determination at 502 is positive then an arithmetical operation is performed on the value of the previously used frequency at 503 and then the modified value of the previously used frequency is stored in the parameter storage area at 505. The storing process at 505 may be a two-stage process comprising firstly dividing the frequency value by a scaling factor (200 kHz, for example) and then storing the result in the parameter storage area.

Figure 6:
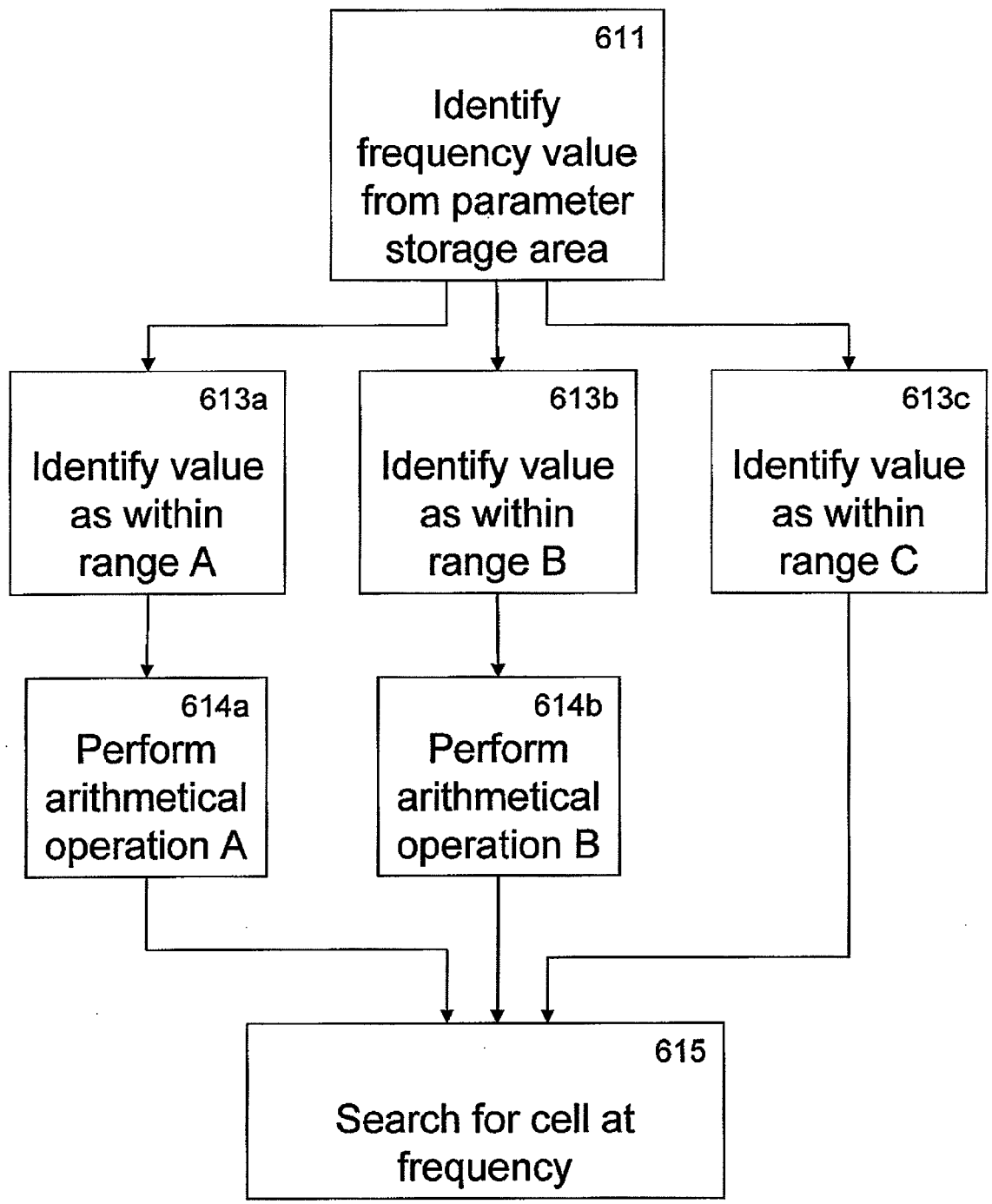
FIG. 6 illustrates a method of reading additional frequencies.

FIG. 6 illustrates a method of reading additional frequencies wherein an arithmetical operation may be performed on a read value. At 611 a frequency value is identified from the parameter storage area. 611 may be a two-stage process comprising firstly reading a value from the parameter storage area, then multiplying this value by a scaling factor (200 kHz, for example) to arrive at the read value as a frequency. At 613a, b and c it is determined whether the read value lies within one of three ranges. In this example, range C comprises all values not within range A or range B. If the read value is identified as lying within range A at 613a then at 614a arithmetical operation A is performed. If the value is identified as lying within range B, as indicated at 613b, then at 614b arithmetical operation B is performed on the read value. If the read value is identified as lying within range C, as determined at 613C, then no arithmetical operation is performed and the process proceeds to 615 where a search for a cell at the identified frequency is performed. Alternatively, range C may be implicitly defined as anything not in range A or range B such that where the read value lies within a defined range (range A or range B) then the arithmetical operation for that range is performed, but where the read value does not lie in a defined range, then no arithmetical operation is performed.

In an alternative example, only one range may be defined such that if the read value is within that range, then an arithmetical operation is performed on the value before use, but if the read value is outside of that range then no arithmetical operation is performed on the value before use.

Figure 7:
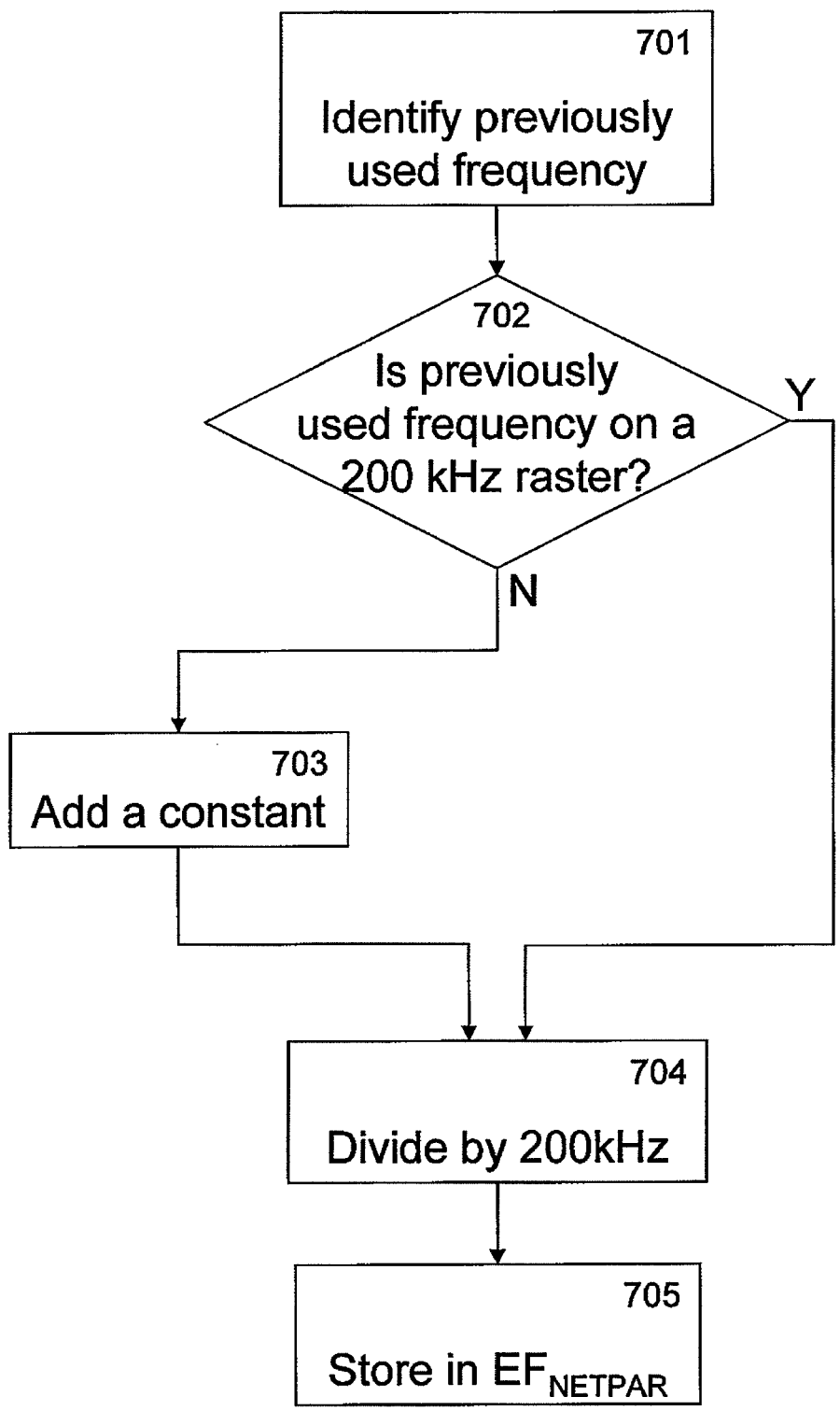
FIG. 7 illustrates an example of the method of storing additional frequencies.

FIG. 7 illustrates an example of a method of storing additional frequencies. At 701 a previously used frequency is identified as requiring storage. At step 702 it is determined whether the previously used frequency lies on the 200 kHz raster. This determination may be made by dividing the value of the previously used frequency by 200 kHz and determining whether the answer is a whole number. If the previously used frequency lies on the 200 kHz raster, then the value of the frequency is divided by 200 kHz at 704 and the value is stored in $EF_{NETPAR}$ at 705. Conversely, if the previously used frequency does not lie on the 200 kHz raster then at 703 a constant is added to the value of the frequency to produce a modified value. This modified value is then divided by 200 kHz at 704 and stored in $EF_{NETPAR}$ at 705.

Figure 8:
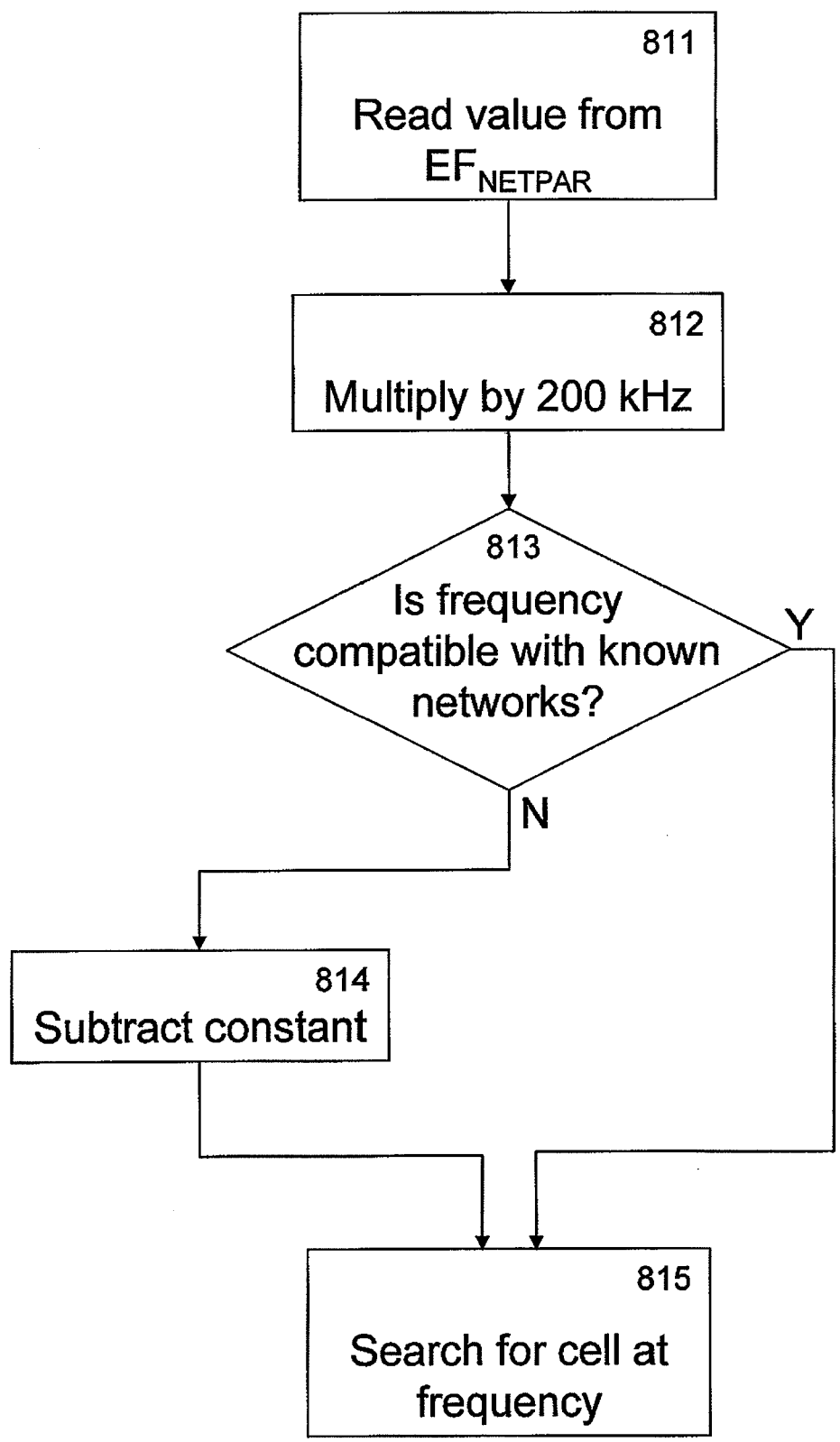
FIG. 8 illustrates an example of the method of reading additional frequencies.

FIG. 8 illustrates an example of the method of reading additional frequencies. At 811 a value is read from $EF_{NETPAR}$ and at 812 this value is multiplied by 200 kHz to give a frequency value. At 813 it is determined whether this frequency is compatible with known networks. Such a determination may be made by determining whether the frequency value lies within one of the ranges shown in the table of FIG. 2. If the determination at 813 is positive then at 815 a cell search is performed at that frequency. If the determination at 813 is negative then it is determined that the value read had been offset prior to storage in $EF_{NETPAR}$ (for example, as described above with reference to FIG. 7) and so this offset is removed by subtracting a constant at 814. The constant used in 814 is the same as the constant used in 703 for creating the modified value. Then, the value with the offset removed gives a frequency which is compatible with known networks and so at 815 a search for a cell at that frequency is performed.

Figure 9:
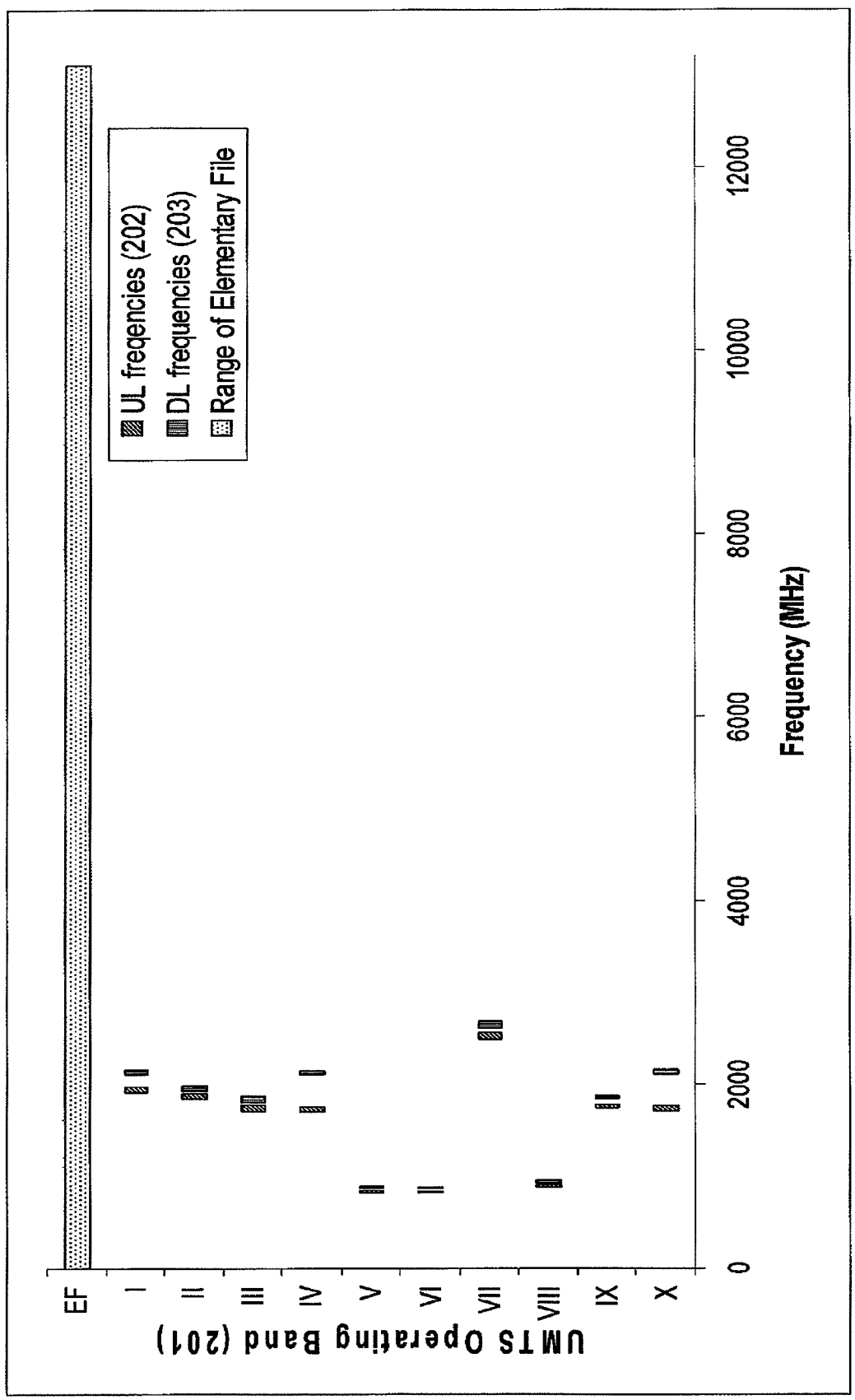
FIG. 9 shows the relative positions of the uplink and downlink frequency ranges for each UMTS operating band with the available range for storage.

FIG. 9 is similar to FIG. 3 and shows the relative positions of the uplink and downlink frequency ranges for each UMTS operating band. FIG. 9 also shows the range for storage of the $EF_{NETPAR}$, this being 0 to 13100 MHz. As in FIG. 3, uplink frequencies 202 are shown with diagonal shading and downlink frequencies 203 are shown with vertical shading. The range of the elementary file $EF_{NETPAR}$ is shown using dotted shading. Frequency in MHz is shown on the horizontal axis with the range from 0 to 13200 MHz. It is apparent from FIG. 9 that a significant proportion of the frequency range of $EF_{NETPAR}$ goes unused in a UE arranged to work with current known bands I to X.

Figure 10:
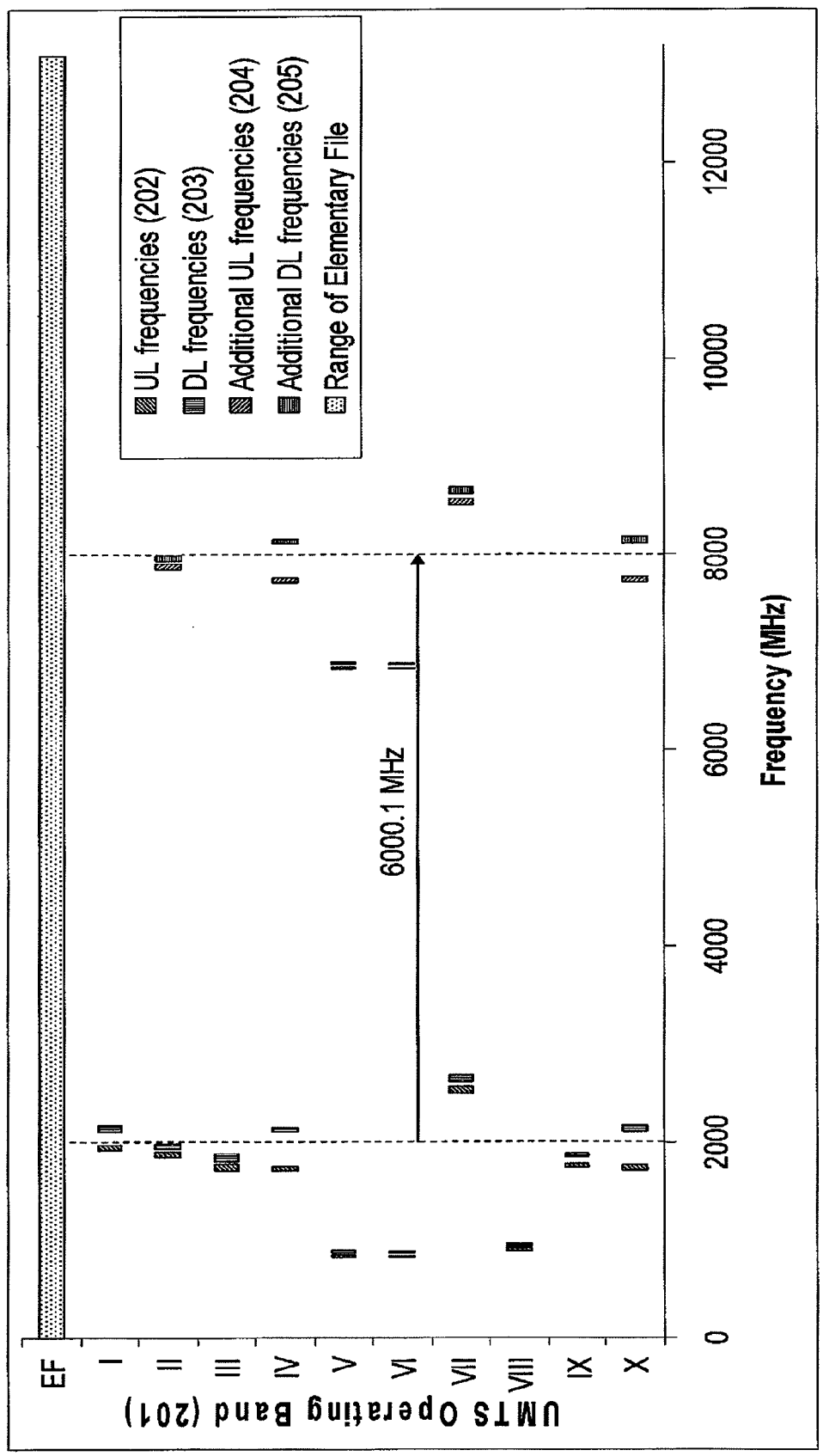
FIG. 10 shows the relative positions of the uplink and downlink frequency ranges for each UMTS operating band with the available range for storage and offset ranges for storing additional frequencies.

FIG. 10 is a copy of FIG. 9 additionally showing the regions in which additional frequencies may be stored using an offset constant of 6000.1 MHz as an example. Additional uplink frequencies 204 are shown with diagonal shading travelling down the page from left to right and additional downlink frequencies 205 are shown with horizontal shading. Of course, it should be understood that another offset value could be used. However, it is advantageous for the offset value to conform to n×200 kHz+100 kHz, where n is any whole number. In the example shown where the offset is 6000.1 MHz, n takes the value of 30000. Such an offset value, with a suitably high value of n, results in the additional frequencies being stored in a frequency region where no known networks exist and also shifts the frequency value onto the 200 kHz raster. In the example given, a single constant is used to offset all frequency bands. However, in alternative embodiments different values of the offset constant may be used for one or more particular bands.

It should be noted that the above-described methods are backward compatible to the extent that 200 kHz raster values can be read from $EF_{NETPAR}$ using a conventional reading method. Such a conventional reading method would misinterpret the modified values. For example, a UE reading the additional uplink frequencies 204 of band II would identify each frequency as lying between 7850.1 MHz and 7910.1 MHz. At the time of writing there are no known UMTS networks operating within this frequency band. Nevertheless, if a UE were to read these values from $EF_{NETPAR}$ then the UE would attempt to search for a cell in the wrong part of the spectrum where it will find no valid PLMN. Once no PLMN is found the UE will move onto the next stored value. However, it should be noted that normally the device that reads from $EF_{NETPAR}$ is also the device that wrote to $EF_{NETPAR}$. It is unlikely that a method of storing additional frequencies as described above would be implemented in a device without a corresponding method for reading the additional frequencies, and so the above described misinterpretation of modified values stored in $EF_{NETPAR}$ is unlikely.

Figure 11:
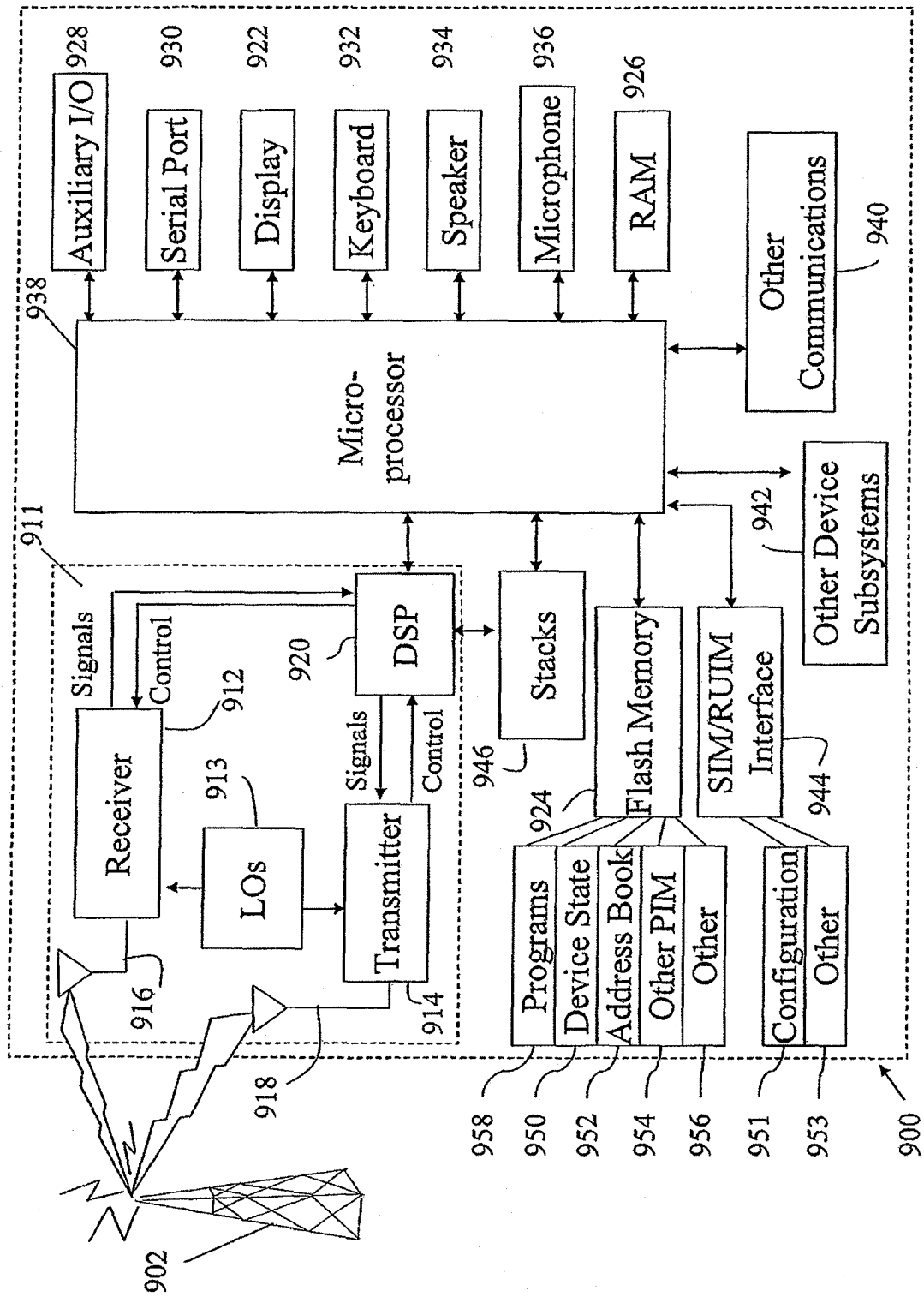
FIG. 11 is a block diagram illustrating a mobile device, which can act as a UE and co-operate with the apparatus and methods of FIGS. 1 to 10.

Turning now to FIG. 11, this is a block diagram illustrating a mobile device, which can act as a UE and co-operate with the apparatus and methods of FIGS. 1 to 10, and which is an exemplary wireless communication device. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, or EDGE network.

Network access requirements will also vary depending upon the type of network 902. For example, in the Mobitex and DataTAC networks, mobile station 900 is registered on the network using a unique identification number associated with each mobile station. In UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 11, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 11 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station user's corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 11, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

When mobile device 900 is used as a UE, protocol stacks 946 include a method and apparatus for storing frequencies.

EXTENSIONS AND ALTERNATIVES

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A method of operating a wireless communications apparatus, the method comprising:
   comparing the value of a previously used frequency with a frequency raster of a parameter storage area to identify whether the value of a previously used cell frequency is incompatible with the frequency raster of the parameter storage area;
   responsive to identifying the incompatibility:
      performing an arithmetical operation on the value of the incompatible previously used frequency to give a modified value of the previously used cell frequency lying within one of at least one predetermined range compatible with the frequency raster of the parameter storage area; and
      storing the modified value of the previously used cell frequency in the parameter storage area.

2. The method as claimed in claim 1, wherein the previously used cell frequency is identified as incompatible because it lies on a 100 kHz raster.

3. The method as claimed in claim 1, wherein the previously used cell frequency is identified as incompatible because the result of dividing it by 200 kHz is not a whole number value.

4. The method as claimed in claim 1, wherein the arithmetical operation is to add a constant.

5. The method as claimed in claim 4, wherein the constant is positive.

6. The method as claimed in claim 5, wherein the constant is greater than any frequency the wireless communications apparatus is arranged to use for radio communication.

7. The method as claimed in claim 4, wherein the constant is negative.

8. The method as claimed in claim 7, wherein the constant has a value which results in an incompatible frequency being stored as a value which is less than any frequency the wireless communications apparatus is arranged to use for radio communication.

9. The method as claimed in claim 1, wherein the arithmetical operation is dependent upon the value of the previously used cell frequency.

10. The method as claimed in claim 1, wherein the arithmetical operation is independent of the value of the previously used cell frequency.

11. The method as claimed in claim 1, wherein the wireless communications apparatus is arranged to communicate with a UMTS network and the parameter storage area is $EF_{NETPAR}$.

12. A computer program product comprising code means stored on a non-transitory computer readable medium for performing the steps of the method of claim 1.

13. A computer operating under the instructions of a computer program product comprising code means stored on a non-transitory computer readable medium as claimed in claim 12.

14. A wireless communications apparatus comprising:
   a parameter storage area for storing a previously used cell frequency; and
   a processor configured to:
   compare the value of the previously used cell frequency with a frequency raster of the parameter storage area to identify whether the value of the previously used cell frequency is incompatible with the frequency raster of the parameter storage area; and
   responsive to identifying the incompatibility:
      perform an arithmetical operation on the value of the incompatible previously used cell frequency to give a modified value of the previously used cell frequency lying within one of at least one predetermined range compatible with the frequency raster of the parameter storage area; and
      store the modified value of the previously used cell frequency in the parameter storage area.

15. A method, in a wireless communications apparatus, the method comprising:
   reading a stored value of a previously used cell frequency from a parameter storage area;
   identifying whether the stored value is compatible with a network within which the apparatus is operable by determining whether the stored value is within one of at least one predetermined range;
   responsive to determining the stored value is within one of at least one predetermined range compatible with the frequency raster of the parameter storage area:
      performing an arithmetical operation on the stored value to give a corrected value of the previously used cell frequency, wherein the arithmetical operation is dependent upon the stored value of the previously used cell frequency; and
      searching for a cell of the communication network at the corrected value of the previously used cell frequency.

16. The method as claimed in claim 15, wherein the arithmetical operation is to subtract a constant.

17. The method as claimed in claim 16, wherein the constant is positive.

18. The method as claimed in claim 17, wherein the constant results in the corrected value of the previously used cell frequency being within a range of frequencies that the wireless communications apparatus is arranged to use for radio communication.

19. The method as claimed in claim 16, wherein the constant is negative.

20. The method as claimed in claim 19, wherein the constant results in the corrected value of the previously used cell frequency being within a range of frequencies that the wireless communications apparatus is arranged to use for radio communication.

21. The method as claimed in claim 15, wherein the wireless communications apparatus is arranged to communicate with a UMTS network and the parameter storage area is $EF_{NETPAR}$.

22. A computer program product comprising code means stored on a non-transitory computer readable medium for performing the steps of the method of claim 15.

23. A computer operating under the instructions of a computer program product comprising code means stored on a non-transitory computer readable medium as claimed in claim 22.

24. A wireless communications apparatus comprising:
a parameter storage area for storing a previously used cell frequency; and
a processor configured to
read the stored value of a previously used cell frequency from a parameter storage area;
identify whether the stored value is compatible with a network within which the apparatus is operable by determining whether the stored value is within one of at least one predetermined range compatible with the frequency raster of the parameter storage area;
responsive to determining the stored value is within one of at least one predetermined range:
perform an arithmetical operation on the stored value to give a corrected value of the previously used cell frequency, wherein the arithmetical operation is dependent upon the stored value of the previously used cell frequency; and
search for a cell of the communication network at the corrected value of the previously used cell frequency.

* * * * *